United States Patent
Klumpe et al.

(10) Patent No.: US 9,920,164 B2
(45) Date of Patent: Mar. 20, 2018

(54) METHOD FOR PRODUCING MONOHYDROXYPOLYALKYLENE OXIDES

(75) Inventors: Markus Klumpe, Mannheim (DE); Matthias Zipplies, Neustadt (DE)

(73) Assignee: BASF SE, Ludwigshafen (DE)

( * ) Notice: Subject to any disclaimer, the term of this patent is extended or adjusted under 35 U.S.C. 154(b) by 325 days.

(21) Appl. No.: 13/322,743

(22) PCT Filed: Jun. 16, 2010

(86) PCT No.: PCT/EP2010/058461
§ 371 (c)(1),
(2), (4) Date: Nov. 28, 2011

(87) PCT Pub. No.: WO2010/146082
PCT Pub. Date: Dec. 23, 2010

(65) Prior Publication Data
US 2012/0078019 A1    Mar. 29, 2012

(30) Foreign Application Priority Data

Jun. 18, 2009 (EP) .................................... 09163083

(51) Int. Cl.
*C08G 65/26* (2006.01)

(52) U.S. Cl.
CPC ..... *C08G 65/2609* (2013.01); *C08G 65/2612* (2013.01); *C08G 65/2645* (2013.01)

(58) Field of Classification Search
CPC ............ C08G 65/2609; C08G 65/2648; C08G 65/2612; C08G 65/2645
USPC ....................................................... 568/618
See application file for complete search history.

(56) References Cited

U.S. PATENT DOCUMENTS

| 2,868,295 | A | * | 1/1959 | Dumbauld et al. ........... 166/292 |
| 6,166,112 | A | | 12/2000 | Hirata et al. |
| 2005/0182162 | A1 | * | 8/2005 | Hayashiya et al. ............... 524/2 |
| 2006/0045866 | A1 | | 3/2006 | Chappelow et al. |
| 2006/0074200 | A1 | | 4/2006 | Daugs et al. |
| 2007/0213479 | A1 | | 9/2007 | Daugs et al. |
| 2008/0076947 | A1 | | 3/2008 | Poellmann et al. |
| 2010/0041160 | A1 | | 2/2010 | Chappelow et al. |
| 2010/0288167 | A1 | * | 11/2010 | Wurm et al. .................. 106/499 |

FOREIGN PATENT DOCUMENTS

| EP | 0 884 290 | 12/1998 |
| WO | 2006 028745 | 3/2006 |
| WO | 2006 036825 | 4/2006 |
| WO | 2006 061110 | 6/2006 |

OTHER PUBLICATIONS

International Search Report dated Nov. 5, 2010 in PCT/EP10/058461 Filed Jun. 16, 2010.
U.S. Appl. No. 13/197,336, filed Aug. 3, 2011, Klumpe, et al.

* cited by examiner

*Primary Examiner* — Rosalynd A Keys
(74) *Attorney, Agent, or Firm* — Oblon, McClelland, Maier & Neustadt, L.L.P.

(57) ABSTRACT

The present invention relates to a process for the preparation of monohydroxypolyalkylene oxides (MPAO) which are substantially free of diols, comprising the reaction of at least one monoalcohol as a starter with at least one alkylene oxide in the presence of at least one basic catalyst, the catalyst being used as a solution in water or alcohol or in solvent mixtures which comprise water and/or alcohol.

12 Claims, No Drawings

METHOD FOR PRODUCING MONOHYDROXYPOLYALKYLENE OXIDES

CROSS-REFERENCE TO RELATED APPLICATIONS

This application is a National Stage of PCT/EP2010/058461 filed on Jun. 16, 2010. The application is based upon and claims the benefit of priority to European Application No. 09163083.0 filed on Jun. 18, 2009.

BACKGROUND OF THE INVENTION

The present invention relates to a process for the preparation of monohydroxypolyalkylene oxides (MPAO) which are substantially free of diols.

Mixtures of monohydroxypolyalkylene oxides having an oligomodal molar mass distribution, which have at least two maxima, are furthermore claimed, the difference between the average molar masses of two maxima being from 80% to 125% of the molar mass of the component with the highest proportion in the mixture and the content of the components to be coordinated with the individual maxima being in each case from 30 to 1000 times the component which is to be coordinated with the maximum with the next highest molar mass.

Preferred embodiments are to be found in the subclaims and the description.

High molecular weight monohydroxypolyalkylene oxides are used, inter alia, in large amounts in the preparation of dispersants and flow improvers for mineral building materials. After their preparation, such polyethers are usually esterified with an olefinically unsaturated carboxylic acid, such as acrylic acid or methacrylic acid. These esters are copolymerized in a further step with a multiplicity of possible monomers to give the desired flow improver. This is described, for example, in EP 1 507 815 and EP 884 290.

Monohydroxypolyalkylene oxides are generally prepared by ring-opening polymerization of alkylene oxides with monoalcohols as a starter and basic catalysts. In general, a significant proportion of byproducts having two free OH groups, referred to below as diols, forms here from the alkylene oxide and water present in the reaction mixture or diols already present in the reaction mixture. The water can be introduced into the reaction mixture in various ways. Thus, starting materials used often already comprise relatively small amounts of water. If, for example, solid metal hydroxides are used as catalysts, water forms in the reaction of the catalyst with the alcoholic hydroxyl groups present. Residues from the cleaning of the reaction containers are moreover a source of water which is not to be underestimated.

EP 965605 describes the cleaning of a reactor. For this purpose, said reactor is washed out with water, then blown out with nitrogen and then heated under reduced pressure for further drying. In a second step for removing water, the reactor is washed out again with methanol and acetonitrile, blown out with nitrogen and dried under reduced pressure at elevated temperature. Only now is the reactor ready for the ethoxylation, which is carried out with the use of solid sodium methylate as a catalyst.

US 2006/0074200 describes the ethoxylation of a starter alcohol using potassium hydroxide in diethylene glycol dimethyl ether, cleaning of the reactor with diethylene glycol dimethyl ether preceding the reaction.

DE 10 2004 059489 describes the alkoxylation of a starter alcohol using a solid basic catalyst, the constituents initially taken for the reaction being dewatered under reduced pressure at from 80 to 90° C. before the alkoxylation.

It was an object of the present invention to provide a simple process which is suitable for preparing highly pure monohydroxypolyalkylene oxides which are substantially free of diols. The intention was that the process should function independently of the water content of the catalyst used. Moreover, the process should be capable of being carried out efficiently with a high degree of utilization of the apparatuses used.

The object was achieved by the process, mentioned at the outset, for the preparation of MPAO, which comprises the reaction of at least one monoalcohol as a starter with at least one alkylene oxide in the presence of at least one basic catalyst, the catalyst being used as a solution in water or in alcohol or in solvent mixtures which comprise water and/or alcohol.

In principle, any base is suitable as the basic catalyst. The suitable catalysts include in particular those which have a $pK_B$ of less than 4.5, preferably less than or equal to 1.74. The $pK_B$ value is the negative logarithm to the base ten of the base dissociation constant. It is determined by methods known to the person skilled in the art. In particular, according to the definition familiar to the person skilled in the art, strong or very strong bases which are present in aqueous solution in substantially completely dissociated form are preferred (cf. for example Matthias Otto, Analytische Chemie, Wiley Verlag, $3^{rd}$ edition 2006, page 51 et seq.). Suitable bases may be organic or inorganic compounds.

Suitable inorganic bases are, for example, metal salts of inorganic acids or metal oxides or metal hydroxides. In a preferred embodiment, metal hydroxides are used. Furthermore, salts of inorganic acids with alkali or alkaline earth metals are preferred. Hydroxides of alkali or alkaline earth metals are particularly preferred. Sodium hydroxide, potassium hydroxide or calcium hydroxide is very particularly preferred. Potassium hydroxide is particularly preferred.

Suitable organic bases may be ionic or nonionic or may have a partly ionic character. In one embodiment, suitable bases are organic compounds without a metal constituent. In another embodiment, organometallic compounds are used. In a preferred embodiment, the catalyst is a metal alcoholate. Alcoholates of alkali or alkaline earth metals are preferred and alcoholates of sodium and potassium are particularly preferred. Furthermore, alcoholates of aliphatic or cycloaliphatic alcohols are preferred. The use of aromatic alcoholates is possible but less preferred according to the invention. Alcoholates of linear or branched alkanols are particularly preferred, especially those of $C_1$- to $C_5$-alkanols. Methanolates and ethanolates are very particularly preferred. Sodium methanolate and potassium methanolate are particularly preferred. It is also possible to use mixtures of different catalysts.

According to the invention, the catalyst is used in solution in water or alcohol or in solvent mixtures which comprise water and/or at least one alcohol. The proportion of water and alcohol may vary within wide limits. Preferably, the proportion of water and/or alcohol in the solvent mixture is at least 10%, particularly preferably at least 50%, very particularly preferably 80%. Particularly preferably, the solvent for the catalyst comprises at least 80% of water or an alcohol. Preferred alcohols are linear or branched alkanols, particularly preferably having one to five carbon atoms. If the base is an alcoholate, the corresponding alcohol is expediently preferably used as the solvent. Particularly preferred embodiments of the process according to the invention use solutions of sodium hydroxide or potassium hydroxide in water or solutions of sodium methanolate or potassium methanolate in methanol. Because the catalyst is used not as a solid but as a solution, it can be very easily added and metered. The danger of incorrect metering and of inhomogeneities during the mixing with the other components is minimized compared with solids. Moreover, catalyst solutions are safe in terms of occupational hygiene compared with solid catalysts since they do not produce dust and can be stored without caking, compaction or the like occurring.

The process according to the invention can be carried out within a wide range for the base concentration. Preferred solutions are those having a base content of from 1 to 80% by weight, preferably from 5 to 70% by weight, very particularly preferably from 10 to 60% by weight and particularly preferably from 30 to 50% by weight.

In the process according to the invention, starters have the function of initiating the reaction with the alkylene oxides. Conceivable starters are in principle all substances which can react with epoxide groups with ring opening. The molar amount of starter used in the process according to the invention is in general small compared with the molar amount of alkylene oxide.

According to the invention, monoalcohols which comprise substantially no diols are used as starters. The proportion of diols in the starter may be, for example, less than 10000 ppm but as a rule is less than 4000 ppm. The proportion of diols in the starter is preferably less than 1000 ppm.

The starter is preferably a monoether or oligoether which are composed of one or more alkylene oxides. In general, the same alkylene oxides which are also preferred for the reaction with the starter for the preparation of MPAO are preferred for this purpose. However, it is not essential that, in a reaction, the starter be composed of the same alkylene oxides as those with which it is reacted. The starter preferably comprises from one to fifteen identical or different alkylene oxide units. The starter particularly preferably comprises from one to five alkylene oxide units, very particularly preferably two or three alkylene oxide units.

Suitable starters are known per se or can be prepared by means of methods which are known per se to the person skilled in the art. For the synthesis of the starters, at least one alkylene oxide is reacted with at least one monoalcohol, which may preferably be an aliphatic, cycloaliphatic or aromatic monoalcohol. It is preferably a linear or branched alkanol having one to twelve carbon atoms, particularly preferably methanol, ethanol, propanol or butanol. Methanol is particularly preferred. For the process according to the invention, it is also possible to use mixtures of different starters.

In a particular embodiment, the starter is likewise prepared by a process according to the invention.

In a preferred embodiment, compounds or mixtures of compounds of the general formula (I)

in which $R^1$ is an aliphatic or an aromatic radical,
$R^2$ is hydrogen or an aliphatic or an aromatic radical,
k is an integer from 1 to 15,
are used as starters.

k is preferably an integer from 1 to 5, and k is particularly preferably an integer from 1 to 3.

$R^1$ is preferably an aliphatic radical, $R^1$ is particularly preferably a linear or branched alkyl radical having 1 to 13 carbon atoms, $R^1$ is very particularly preferably methyl, ethyl, propyl, butyl or dodecyl, and $R^1$ is particularly preferably methyl.

$R^2$ is preferably hydrogen or an alkyl radical. $R^2$ is particularly preferably H, —CH$_3$ or —CH$_2$CH$_3$.

According to the invention, the starter or the starter mixture is reacted with alkylene oxide.

Suitable alkylene oxides for the preparation of MPAO may be liquid or gaseous under normal conditions or under the reaction conditions. They may comprise a terminal or internal epoxide group. Alkylene oxides having a terminal epoxide group are preferred.

Suitable alkylene oxides may be unsubstituted, monosubstituted or disubstituted. They are preferably unsubstituted or monosubstituted. Substituted alkylene oxides may carry one or more aliphatic, cycloaliphatic, araliphatic or aromatic radicals. Suitable alkylene oxide radicals having a linear or branched alkyl chain are preferably substituted. In a preferred embodiment, this alkyl chain has one to ten carbon atoms, for example one to five carbon atoms.

Particularly preferred alkylene oxides are selected from ethylene oxide, propylene oxide, n-butylene oxide, isobutylene oxide, 1,2-epoxypentane, decene oxide and styrene oxide.

Alkylene oxides may be used alone or as a mixture of different alkylene oxides. Suitable alkylene oxides are substantially free of water. Alkylene oxides preferably have a water content of less than 300 ppm, particularly preferably less than 50 ppm.

The addition of starter and catalyst may take place simultaneously or in succession. According to the invention, the sequence of addition is in general not important.

A distillation step is preferably effected before the addition of alkylene oxides. Distillation is preferably effected at temperatures of from 80 to 145° C., particularly preferably at from 120 to 135° C. A distillation vacuum of from 10 too 500 mbar, preferably from 60 to 200 mbar, particularly preferably from 150 to 170 mbar, is usually applied. In a preferred embodiment of the invention, the distillation step is carried out in such a way that starter and catalyst are heated with simultaneous evacuation under a distillation vacuum. On reaching the distillation temperature, the mixture is subjected to the distillation conditions for a certain time span. This time span may be short, for example less than one hour. The length of this time span depends, for example, on the boundary conditions of the apparatus and the starting materials used. It can be adapted appropriately by the person skilled in the art. For the distillation, it may be expedient to carry out phases with different pressures and temperatures in succession. The distillation temperatures and pressures can be kept constant over a period but can also be varied as ramps in which pressure and/or temperature constantly increase or decrease.

It may be advantageous to distill off not only the amount of water present in the mixture of starter and catalyst solution but also a part of the initially taken starter. The starter possibly acts as an entraining agent for removing unidentified components from the initially taken mixture, which components have a disadvantageous effect on the course of the reaction and, for example, on the color number of the product.

In a preferred embodiment, the distillation is carried out in such a way that an amount of from 0.1 to 30% by weight of the initially taken starter alcohol is distilled off. Preferably from 0.1 to 25% by weight, particularly preferably from 1 to 20% by weight, are distilled off. For example, from 5 to 15% by weight of starter alcohol are distilled off in one embodiment and from 10 to 20% by weight in another one. After the end of the distillation, the starter/catalyst mixture is substantially free of water. Typically, this then comprises less than 1000 ppm of water. In some cases, a relatively large amount of water, for example up to 5000 ppm, is still present after the distillation. Preferably, however, the distillation is carried out so that less than 500 ppm or less than 200 ppm of water are present in the mixture.

In a preferred embodiment, the starter distilled off can be collected and reused.

The addition of alkylene oxide is advantageously effected after the end of the distillation. The alkylene oxides react with the initially taken starter. If the alkylene oxides used are gaseous under normal conditions, the addition is expediently effected under elevated pressure. The addition of alkylene oxide is preferably distributed over a relatively long period, for example over several hours. The addition may be interrupted and then resumed. If different alkylene oxides are used, these can be added as a mixture or in succession. After the total amount of alkylene oxide has been added, the reaction mixture can be stirred until the pressure is constant at reaction temperature, in order to ensure as complete a conversion of the alkylene oxide as possible. Residual amounts of free alkylene oxide can be removed from the reaction mixture by applying reduced pressure.

After the end of the reaction, the reaction mixture is as a rule neutralized with at least one acid. Moreover, stabilizers or further additives can optionally be added. Acids and further additives can be added either directly after the end of the reaction or at a later time. This can be effected either in the same container in which the reaction is carried out or at another point. The addition can be carried out, for example, in another stirred tank or continuously in a pipeline. Preferably, neutralization is first effected and further additives are introduced in subsequent steps.

Suitable acids for neutralizing the MPAO are in principle all organic or inorganic acids. Suitable acids have as a rule a higher acidity than the alcohols prepared. Preferably, the $pK_a$ of the acid has a difference of at least two relative to the alcohols generated by the neutralization. Preferred inorganic acids are, for example, hydrochloric acid and phosphoric acid. Organic acids are furthermore preferred. Acetic acid, isononanoic acid, lactic acid or para-toluenesulfonic acid are very particularly preferred. Mixtures of different acids can also be used.

Stabilizers which may be used are, for example, light stabilizers and antioxidants known to the person skilled in the art. These are in particular phenols and sterically hindered amines (HALS). For example, 2,6-Di-tert-butyl-4-methylphenol (BHT), para-methoxyphenol, hydroquinone and sterically hindered phenols, as are sold, for example, under the trade name Irgastab™ Pure, Irganox™ or Tinuvin™, are preferred. If appropriate, the stabilizer may also comprise secondary stabilizers, such as phosphites or phosphonites.

In one embodiment of the invention, a reactor cleaning step is effected before the abovementioned process steps. This can be carried out, for example, with steam or with liquid water. In a preferred embodiment, the process according to the invention is carried out without the reactor being subjected to cleaning after discharge of the reaction mixture of the preceding production batch. Because the process according to the invention can be carried out without cleaning steps between the production batches, the usable capacity of the reactor is substantially increased. Furthermore, by saving solvents for washing, which moreover are often used in anhydrous form, costs are cut and the waste balance of the process improved.

If no cleaning of the reaction container is carried out, up to 2% by weight, based on the reactor capacity of MPAO from the preceding production batch are still present in the reactor before the addition of the components. The properties of the products thus obtained with respect to diol content, average molar mass, color number and viscosity and rheological properties are comparable to those before the preparation of which the reactor had been cleaned and which have a comparable average molar mass. The process with this characteristic is preferred for polymers having a molar mass of from 300 to 20000 g/mol, particularly preferably from 500 to 10000 g/mol, very particularly preferably from 750 to 8000 g/mol, particularly preferably from 1000 to 5000 g/mol.

Accordingly, mixtures of MPAO were found which show oligomodal molar mass distributions which have at least two maxima. MPAO mixtures according to the invention comprise a main product whose proportion is substantially higher than that of the other polymeric constituents. The difference in the molar mass compared with the next highest and next lowest maximum is as a rule from 80% to 125%, preferably from 90% to 115%, of the molar mass of the component with the highest proportion in the mixture. The content of the components to be coordinated with the individual maxima is in each case from 30 to 1000 times, preferably from 50 to 500 times, particularly preferably from 75 to 200 times, the component which is to be coordinated with the maximum with the next highest molar mass.

MPAO mixtures according to the invention have properties with respect to rheological properties and diol content which are comparable with those of MPAO mixtures having monomodal molar mass distributions with the same average molar mass, although mixtures according to the invention have a proportion of polymers with a substantially higher molecular weight. Moreover, they have some additional advantages. Thus, the exact polymer distributions are very characteristic. MPAO mixtures according to the invention show a plant-specific finger print. This facilitates quality control of the products in that individual product batches can be assigned subsequently to individual producers and even individual production plants, possibly even individual production campaigns.

Monohydroxypolyalkylene oxides MPAO which have been prepared by the process according to the invention are substantially free of diols. They preferably have a diol content of not more than 10000 ppm, particularly preferably of not more than 6000 ppm, very particularly preferably of not more than 4000 ppm, particularly preferably of 3000 ppm. They may be composed of one alkylene oxide or may be copolymers of different alkylene oxides. The copolymers may be random copolymers or block copolymers.

MPAO according to the invention preferably comprise from five to 400 alkylene oxide units, particularly preferably from 10 to 200, very particularly preferably from 15 to 100 and particularly preferably from 20 to 50. The OH number of the polymers is determined according to DIN 53240 and can be converted by the person skilled in the art into the average molar mass. MPAO which are composed only of ethylene oxide have, for example, an average molar mass of from 300 to 20000 g/mol, preferably from 500 to 10000, particularly preferably from 750 to 8000 g/mol, particularly preferably from 1000 to 5000 g/mol.

The molar mass of the MPAO can be very readily controlled and reproduced by the process according to the invention. If the process according to the invention is carried out several times in succession, the OH numbers show only a small variation. For products which comprise exclusively ethylene oxide as the alkylene oxide, the OH numbers vary, for example, by not more than 2.0 mg KOH/100 g, preferably by 1.0 mg, particularly preferably by 0.7 mg and very particularly preferably by 0.5 mg KOH/100 g. The diol contents of the MPAO vary only by one standard deviation of not more than 2500 ppm.

Polymers according to the process according to the invention are suitable for further reaction for use in emulsifiers, dispersants and flow improvers for mineral building materials. Mineral building materials are to be understood in particular as meaning formulations which comprise mineral binders, such as lime, gypsum and/or in particular cement, as essential constituents and sands, gravels or crushed rocks serving as aggregates, or other fillers, such as, for example, natural or synthetic fibers.

EXAMPLES

The following examples are intended to illustrate the properties of this invention, but without limiting it.

"Parts", percent or ppm are understood in this document as meaning proportions by weight, unless stated otherwise.

The determination of the diol content was effected by liquid chromatography by HPLC. For this purpose, the free OH groups of the products were derivatized by reaction with an excess of phenyl isocyanate. The chromatographic separation is then effected by means of an HPLC pump of the Varian® 9012 type on a silica gel column of the Intersil ODS-3 type (5 µm, 150 4 mm). The detection was effected with a UV detector of the Varian® 9050 type.

The OH number was determined according to DIN 53240 by esterification of the OH groups with acetic anhydride and back-titration of the unconsumed acetic acid. The molar mass was calculated from the OH number thus determined.

Preparation of Polyethylene Glycol Monomethyl Ether Having an Average Molar Mass of 1990 g/mol (MPAO 1)

1744 kg of diethylene glycol monomethyl ether and 55.3 kg of a 45% strength solution of potassium hydroxide in water were initially taken in a stirred reactor. The mixture was heated to 125° C. in 30 min under reduced pressure (90 mbar) and the reduced pressure was subsequently eliminated with nitrogen. Thereafter, 24 137 kg of ethylene oxide were metered in at a temperature of 150° C. at a pressure of not more than 5.2 bar. After metering was complete, the reactor content was neutralized by addition of 27.1 kg of acetic acid and the reactor was then emptied.

Preparation of Polyethylene Glycol Monomethyl Ether Having an Average Molar Mass of 2900 g/mol (MPAO 2)

1211 kg of diethylene glycol monomethyl ether were initially taken simultaneously with 50.1 kg of 45% strength by weight potassium hydroxide solution in a reactor. The mixture was heated to 125° C. in 30 min under reduced pressure (90 mbar) and the reduced pressure was subsequently eliminated with nitrogen. Thereafter, 24 669 kg of ethylene oxide were metered in at a temperature of 150° C. at a pressure of not more than 5.6 bar. After metering was complete, the reactor content was neutralized by addition of 26.5 kg of acetic acid and the reactor was emptied. During the emptying, 2.2 kg of 2,6-di-tert-butyl-4-methylphenol were metered into the product stream behind the bottom outflow of the reactor.

Preparation of Polyethylene Glycol Monomethyl Ether Having an Average Molar Mass of 4700 g/mol (MPAO 3)

796 kg of diethylene glycol monomethyl ether were initially taken simultaneously with 36.5 kg of a 45% strength by weight potassium hydroxide solution in a reactor. The mixture was heated to 125° C. in 30 min under reduced pressure (90 mbar) and the reduced pressure was subsequently eliminated with nitrogen. Thereafter, 25 698 kg of ethylene oxide were metered in at a temperature of 150° C. at a pressure of not more than 5.1 bar. After metering was complete, the reactor content was neutralized by addition of 27.1 kg of acetic acid and the reactor was emptied.

Example 1

The polyethylene glycol monomethyl ethers MPAO 1 to 3 described above were carried out in the same reactor in the sequence stated in table 1. The reactor was not cleaned between the individual experiments. The analytical values stated in table 1 were achieved:

TABLE 1

| Example | Product | OH number [mg KOH/100 g] | Diol content [% by wt.] |
|---|---|---|---|
| 1.1 | MPAO 2 | 19.7 | 0.1 |
| 1.2 | MPAO 2 | 19.8 | 0.2 |
| 1.3 | MPAO 2 | 19.1 | 0.2 |
| 1.4 | MPAO 1 | 27.1 | 0.2 |
| 1.5 | MPAO 3 | 12.3 | 0.3 |

Example 2

The polyethylene glycol monomethyl ethers MPAO 1 to 3 described above were carried out in the same reactor in the sequence stated in table 2. The reactor was not cleaned between the individual experiments. The analytical values stated in table 2 were achieved:

TABLE 2

| Example | Product | OH number [mg KOH/100 g] | Diol content [% by wt.] |
|---|---|---|---|
| 2.1 | MPAO 1 | 28.2 | 0.1 |
| 2.2 | MPAO 1 | 28.0 | 0.5 |
| 2.3 | MPAO 1 | 28.4 | 0.4 |
| 2.4 | MPAO 1 | 29.0 | 0.6 |
| 2.5 | MPAO 3 | 11.4 | 0.3 |

Example 3

MPAO 2 was prepared five times in the same reactor. The reactor was not cleaned between the individual experiments. The analytical values stated in table 3 were achieved:

TABLE 3

| Example | Product | OH number [mg KOH/100 g] | Diol content [% by wt.] |
|---|---|---|---|
| 3.1 | MPAO 2 | 19.3 | 0.1 |
| 3.2 | MPAO 2 | 19.4 | 0.3 |
| 3.3 | MPAO 2 | 19.3 | 0.2 |
| 3.4 | MPAO 2 | 19.9 | 0.3 |
| 3.5 | MPAO 2 | 19.1 | 0.3 |

Example 4

MPAO 1 to 3 were prepared in random order 136 times altogether in the same reactor, the sequence of the MPAO batches being interrupted by altogether 94 cleaning operations with water and/or steam and in random order so that between one and eight batches of MPAO were prepared in succession without interruption. The following average analytical values and variations were achieved:

TABLE 4

| Product | φ OH number [mg KOH/100 g] | ±(OHN) [mg KOH/100 g] | φ Diol content [ppm] | ±(Diol content) [ppm] |
|---|---|---|---|---|
| MPAO 1 | 28.61 | 1.38 | 3950 | 2206 |
| MPAO 2 | 19.22 | 0.42 | 2807 | 1735 |
| MPAO 3 | 12.15 | 1.75 | 3000 | 1788 |

We claim:

1. A processes for producing a monohydroxypolyalkylene oxide (MPAO), the process comprising:
combining at least one starter and at least one basic catalyst, to obtain an initial mixture;
distilling the initial mixture until at least 0.1% by weight of the at least one starter is distilled off; and
adding at least one alkylene oxide to the at least one starter and at least one basic catalyst immediately after the distilling, and then reacting the at least one starter with the at least one alkylene oxide in the presence of at least one basic catalyst in solution, to obtain a monohydroxypolyalkylene oxide (MPAO),
wherein:
the monohydroxypolyalkylene oxide (MPAO) obtained from said reacting comprises not more than 10,000 ppm of a diol,
water is present during said reacting of at least one starter with at least one alkylene oxide in the presence of at least one basic catalyst in solution, and the water is present during said reacting in an amount of greater than 1,000 ppm,
each of said at least one starter is a compound represented by formula (I):

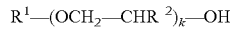  (I);

$R^1$ is an aliphatic or an aromatic radical;
$R^2$ is hydrogen or an aliphatic or an aromatic radical;
k is an integer from 1 to 15; and
the basic catalyst solution comprises an alkali metal hydroxide or an alkali metal methylate and an alcohol other than the starter as the solvent of the basic catalyst solution.

2. The process of claim 1, wherein, in formula (I):
$R^1$ is a $C_1$ to $C_{13}$-alkyl radical;
$R^2$ is hydrogen or a $C_1$- to $C_4$-alkyl radical; and
k is an integer from 1 to 5.

3. The process of claim 1, wherein the each starter is diethylene glycol monomethyl ether.

4. The process of claim 1, wherein the alkylene oxide is ethylene oxide.

5. The process of claim 1, wherein the monohydroxypolyalkylene oxide (MPAO) obtained from said reacting comprises not more than 6,000 ppm of a diol.

6. The process of claim 1, wherein the MPAO comprises from 5 to 200 alkylene oxide units.

7. The process of claim 1, carried out in a reactor comprising an initial amount of up to 2% by weight of a maximum reactor content of MPAO, before the reacting.

8. The process of claim 1, wherein each of the at least one starter is obtained by a process comprising reacting at least one monoalcohol with at least one alkylene oxide in the presence of at least one basic catalyst.

9. The process of claim 1, wherein the monohydroxypolyalkylene oxide (MPAO) obtained from said reacting comprises not more than 4,000 ppm of a diol.

10. The process of claim 1, wherein alcohol other than the starter is a linear or branched alcohol having from one to five carbon atoms.

11. The process of claim 1, wherein the monohydroxypolyalkylene oxide (MPAO) obtained from said reacting comprises not more than 2,000 ppm of a diol.

12. The process of claim 1, wherein water is present during said reacting of at least one starter with at least one alkylene oxide in the presence of at least one basic catalyst in solution, and the water is present during said reacting in an amount of greater than 1,000 ppm to 5,000 ppm.

* * * * *